Feb. 16, 1926.
F. F. SMALL ET AL
1,573,098
MULTIPLE SPEED PLANETARY GEAR TRANSMISSION MECHANISM
Original Filed May 29, 1924
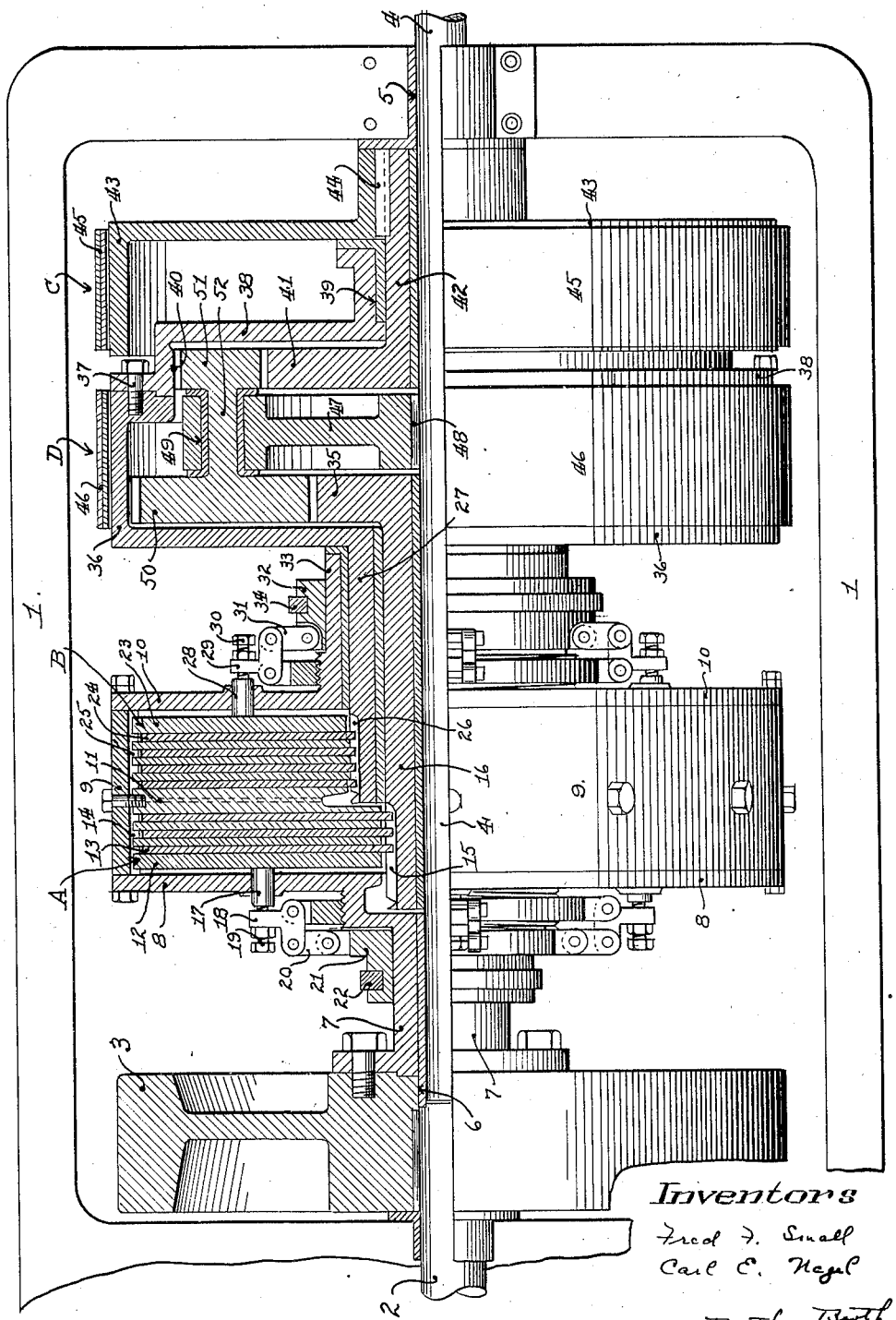
Inventors
Fred F. Small
Carl C. Nagel
By Booth & Booth
Attorneys.

Patented Feb. 16, 1926.

1,573,098

UNITED STATES PATENT OFFICE.

FRED F. SMALL AND CARL E. NAGEL, OF OAKLAND, CALIFORNIA.

MULTIPLE-SPEED PLANETARY-GEAR TRANSMISSION MECHANISM.

Original application filed May 29, 1924, Serial No. 716,559. Divided and this application filed December 16, 1924. Serial No. 756,210.

*To all whom it may concern:*

Be it known that we, FRED F. SMALL and CARL E. NAGEL, citizens of the United States, residing the said SMALL at the city of Oakland, in the county of Alameda and State of California, and the said NAGEL also at Oakland, in the county of Alameda, California, have invented certain new and useful Improvements in Multiple-Speed Planetary-Gear Transmission Mechanisms, of which the following is a specification.

This is a division of our pending application Serial No. 716,559, filed May 29, 1924, and relates to power transmitting mechanisms of the planetary or epicyclic type.

The general object of the invention herein claimed is, as set forth in said pending parent application, to provide a transmission mechanism of the described type in which a plurality of different speed ratios may be obtained with a minimum number of parts. More specifically, our present objects are to provide a planetary transmission mechanism from which three different forward speed ratios and one reverse may be obtained by the use of only three concentric gears connected by one or more planet members, each consisting of but two pinions; and to provide such a mechanism in a form suitable for use in power driven vehicles of the usual type in which the engine is positioned longitudinally of the vehicle, and its power transmitted to the axle by a longitudinally disposed shaft.

Our herein described mechanism is therefore especially adapted for automobiles, motor trucks, tractors, and such types of railway motor cars and locomotives as have a longitudinally disposed driving shaft, for the reason that the driving and driven shafts in said mechanism are axially aligned. It is well suited, moreover, for use in heavy vehicles, such as trucks, busses, rail cars and locomotives, in which it is highly desirable to maintain the engine in driving connection with the wheels at all times, even when shifting from one speed ratio to another. Furthermore, it may be advantageously used in such heavy vehicles, in which the reduced speed ratios must be employed to a considerable extent, because on account of the comparatively small number of gears and other moving parts, the friction losses on such reduced speed ratios are relatively low.

Other objects and advantages of the invention will become apparent from the following specification. It is to be understood, however, that the form and construction of the mechanism may be varied from that shown and described, within the limits of the claims hereto appended, without departing from the essential principles of the invention as set forth in said claims. It is also to be understood that our mechanism is not limited to use in vehicles, but may be employed in any situation in which a variable speed power transmitting mechanism is needed.

With this in view, our invention will now be fully described with reference to the accompanying drawing, in which the figure is a longitudinal partial section of a transmission mechanism embodying a preferred form of the said invention.

In the drawing, the reference numeral 1 designates a fixed frame. 2 is the shaft of an engine, not shown, and 3 is the usual flywheel secured to the end thereof. 4 is a shaft for transmitting power to the driving wheels, not shown, of the vehicle, said shaft constituting the driven member of the mechanism. The driven shaft 4 has a bearing at 5 in the frame 1, and its forward end is preferably journaled at 6 in the fly wheel 3.

Secured to the engine fly wheel 3, and journaled upon the forward end of the shaft 4 is a sleeve 7, whose rear end is secured to or formed integrally with a plate 8, and said plate is secured to a drum or cylindrical housing 9. Said housing has secured to it an opposite end plate 10 and a central plate 11, and encloses two friction clutches respectively designated by the letters A and B.

The clutches A and B may be constructed in any suitable manner, but for purposes of illustration we have shown them as of the multiple plate or disk type. The clutch A comprises two sets of alternately disposed disks 12 and 13 respectively, the former being freely keyed or splined, as indicated at 14, to the housing 9, and the latter similarly keyed or splined, as indicated at 15, to a sleeve 16 journaled upon the shaft 4. As a means for operating said clutch A, we have shown slidable pins 17 extending through the housing end plate 8, and bearing against the endmost of the friction disks 12. Bell cranks 18, provided with adjusting screws 19, act upon said pins 17, and are connected by toggle links 20 with a collar 21 slidably mounted upon the driving sleeve 7, and a thrust ring 22 is rotatably carried in said collar 21 and may be connected in the usual manner with any suitable operating or control mechanism, not shown.

Similarly, the clutch 13 comprises two sets of alternately disposed disks 23 and 24, keyed or splined, at 25 and 26 respectively, to the housing 9 and to a sleeve 27 journaled about the sleeve 16, and said disks are pressed together, and against the central housing plate 11, by pins 28 slidably mounted in the housing end plate 10. Bell cranks 29 are provided with adjusting screws 30 to bear against said pins 28, and are connected by toggle links 31 with a collar 32 slidably mounted upon the hub 33 of the housing plate 10, and said collar is provided with a thrust ring 34 which may be connected with any suitable operating mechanism not shown.

The sleeve 16, which may be connected with the driving member 2 and the sleeve 7 by the clutch A, carries a sun pinion 35. The sleeve 27, which may be connected with said driving member by the clutch B, carries a drum 36, to which is secured, as by screws 37, an end member 38 having a journal 39 about the shaft 4. An internal gear 40 is formed within said end member 38, and therefore rotates with and is virtually a part of the drum 36 and the sleeve 27. A second sun pinion 41 is carried by a sleeve 42 journaled between the shaft 4 and the end member 38, and is positioned in transverse alignment with said internal gear 40 A second drum 43 is secured to the sleeve 42 of said second sun pinion 41, as by means of a key 44.

The drums 43 and 36, connected respectively with the sun pinion 41 and the internal gear 40, are provided with suitable friction brakes respectively designated by the letters C and D. Said brakes may be of any desired type, but for purposes of illustration we have shown them as comprising bands 45 and 46 respectively surrounding the drums 43 and 36. Any suitable and well known means, not shown, may be employed for contracting said bands to cause them to frictionally grip their respective drums and hold the same stationary.

Between the longitudinally spaced sun pinions 35 and 41 is a spider 47 secured upon the driven shaft 4 as by means of a key 48. Said spider carries a plurality of rotatable planet pinion members, one of which is shown journaled in said spider at 49, and which comprises a planet pinion 50 adapted to mesh with the sun pinion 35 and a second planet pinion 51 adapted to mesh with both the internal gear 40 and the sun pinion 41. Said planet pinions are connected together by a preferably integral spindle 52. Thus the sun pinions 35 and 41 and the internal gear 40, which are all concentric, are connected together through the planet pinion member comprising the pinions 50 and 51 and their spindle 52.

The operation of the mechanism above described provides three different speed ratios in a forward direction, and one reverse. The lowest forward speed is obtained by connecting the sun pinion 35 with the driving member 2 by means of the clutch A, and holding the internal gear 40 stationary by means of its brake D. This causes the planet members to travel around the stationary internal gear 40 under the impelling action of said sun pinion 35, thereby rotating the spider 47 and the shaft 4 in the same direction as said sun pinion 35 but at a slower speed. Assuming, for example, that the pitch diameter ratio between the various gears is one for the planet pinion 51, two for the planet pinion 50, three for the sun pinion 35, four for the sun pinion 41, and six for the internal gear 40, then the speed ratio between the driving and driven members will be five to one. The sun pinion 41 revolves idly under such conditions.

The next, or intermediate forward speed is obtained by connecting the internal gear 40 with the driving member 2 by means of the clutch B, and holding the sun pinion 41 stationary by means of the brake C. The sun pinion 35 revolves idly. Assuming the same pitch diameters as above, the speed ratio under these conditions will be 1.66 to 1.

The highest speed, or direct one to one drive is obtained by connecting both the sun pinion 35 and the internal gear 40 with the driving member 2, by engaging both clutches A and B. The entire mechanism then revolves as a unit. Conversely, when both said clutches are disengaged, the driving member 2 revolves idly, and no power is transmitted.

The reverse speed is obtained by connecting the sun pinion 35 with the driving member 2 by means of the clutch A, and holding the sun pinion 41 stationary by means of its brake C. The internal gear 40 revolves idly. The speed ratio under such conditions will be 1.66 to 1, with the driven shaft 4 rotating in the reverse direction from the driving member 2. In any of the above combinations, the driven shaft 4 may be braked by applying both brakes C and D at the same time.

It should be noted that, by the mechanism above described, we are able to provide three different forward speed ratios and one reverse with but three concentric gears and one set of planet members, each such member consisting of but two connected pinions. This result is rendered possible by the arrangement of the clutches and brakes, and by the provision of two concentric gears (40 and 41) meshing with the same planet pinion (51).

It should also be noted that the driving and driven members are axially aligned and are at opposite ends of the mechanism, thus rendering it particularly adaptable to vehicles in which the driving shaft is longitudinally disposed, and further that the entire mechanism is fully enclosed, the clutches by the housing 9 and the gears by the drum 36. Moreover, by positioning both clutches at one end of the mechanism, they may be made of ample size to carry the necessary loads.

We claim:—

1. In a device for the described purpose, a driven shaft; a driving member journaled thereupon; a rotatable drum journaled upon said shaft; a plurality of coaxial gears housed within said drum; means mounted about said shaft and positioned exteriorly to said drum at one end thereof for selectively connecting two of said gears with said driving member; means for releasably holding one of said gears stationary; and a planet pinion member carried by the shaft and adapted to mesh with and connect said coaxial gears.

2. In a device for the described purpose a driven shaft, a driving member journaled thereupon; a rotatable drum journaled upon said shaft; a plurality of co-axial gears housed within said drum, one of said gears being secured thereto; a pair of clutches positioned about said shaft exteriorly to said drum at one end thereof for selectively connecting two of said gears with said driving member; means for releasably holding one of said gears stationary; and a planet pinion member carried by the shaft and adapted to mesh with and connect said co-axial gears, 3. In a device for the described purpose, a driving member; a driven shaft; a plurality of co-axial gears journaled upon said shaft; a housing secured to said driving member and journaled about said shaft and longitudinally spaced from said gears; clutches within said housing for connecting it selectively with two of said gears; means for releasably holding one of said gears stationary; and a planet pinion member carried by the shaft and adapted to mesh with and connect said co-axial gears.

In testimony whereof we have signed our names to this specification.

FRED F. SMALL.
CARL E. NAGEL.